United States Patent
Yamasaki

(10) Patent No.: US 11,346,856 B2
(45) Date of Patent: May 31, 2022

(54) SCANNING PROBE MICROSCOPE AND OPTICAL AXIS ADJUSTMENT METHOD IN SCANNING PROBE MICROSCOPE

(71) Applicant: Shimadzu Corporation, Kyoto (JP)

(72) Inventor: Kenji Yamasaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/133,847

(22) Filed: Dec. 24, 2020

(65) Prior Publication Data

US 2021/0263068 A1 Aug. 26, 2021

(30) Foreign Application Priority Data

Feb. 26, 2020 (JP) .............................. JP2020-030468

(51) Int. Cl.
*G01Q 20/02* (2010.01)
*G01Q 10/04* (2010.01)

(52) U.S. Cl.
CPC ............. *G01Q 20/02* (2013.01); *G01Q 10/04* (2013.01)

(58) Field of Classification Search
CPC ........ G01Q 20/02; G01Q 20/00; G01Q 10/00; G01Q 10/04; G01Q 10/06
USPC ................................... 850/1, 2, 3, 4, 5, 6, 7
See application file for complete search history.

(56) References Cited

U.S. PATENT DOCUMENTS

| 2004/0152211 A1* | 8/2004 | Majumdar ....... G01N 33/54373 435/6.19 |
| 2007/0195333 A1* | 8/2007 | Negishi .................. G01Q 10/06 356/601 |
| 2016/0203968 A1* | 7/2016 | Otsuka ................ H01J 49/0431 356/138 |
| 2018/0172726 A1* | 6/2018 | Nagai .................... G01Q 30/04 |

FOREIGN PATENT DOCUMENTS

JP 2000-346782 A 12/2000

OTHER PUBLICATIONS

Peiponen et al., "Optical Measurement Techniques: Innovations for Industry and the Life Sciences," (2009) pp. 82-85.

* cited by examiner

*Primary Examiner* — Nicole M Ippolito
(74) *Attorney, Agent, or Firm* — Muir Patent Law, PLLC

(57) ABSTRACT

It is intended to save time for adjusting a position of a detection unit. In a position adjustment process of a detector, a control device moves the detector obliquely with respect to a boundary line partitioning photodiodes on a plane on which the detector moves and moves the detector so that the position of the center of gravity of a spot of a laser beam and the center of a light-receiving surface coincide in response to the incident of at least a part of the laser beam on the light-receiving surface.

7 Claims, 8 Drawing Sheets

SCANNING PROBE MICROSCOPE AND OPTICAL AXIS ADJUSTMENT METHOD IN SCANNING PROBE MICROSCOPE

CROSS-REFERENCE TO RELATED APPLICATIONS

This application claims priority under 35 U.S.C. § 119 to Japanese Patent Application No. 2020-030468 filed on Feb. 26, 2020, the entire disclosure of which is incorporated herein by reference in its entirety.

TECHNICAL FIELD

The present invention relates to a scanning probe microscope and an optical axis adjustment method in a scanning probe microscope.

BACKGROUND ART

In a scanning probe microscope, a cantilever beam called "cantilever" with a probe is used. In a scanning probe microscope, the deflection or the change in the oscillation of the cantilever is converted into a change in the reflected light of the laser beam irradiated on the back surface of the cantilever and detected by a photodetector. The photodetector detects the changes in the position, intensity, and phase, etc., of the reflected light. The scanning probe microscope converts the information detected by the photodetector into various physical information (see, for example, Patent Document 1 (Japanese Unexamined Patent Application Publication No. 2000-346782)).

PRIOR ART DOCUMENT

Patent Document
Patent Document 1: Japanese Unexamined Patent Application Publication No. 2000-346782

SUMMARY OF THE INVENTION

Problems to be Solved by the Invention

In a scanning probe microscope, prior to the measurement of a sample, it is required to adjust the position of the photodetector so that the reflected light of the cantilever is correctly incident on the photodetector and the spot of the reflected light is brought to be positioned at the center of the photodetector. Adjusting the position of the photodetector is an operation required every time the cantilever is replaced, and therefore it is desirable to adjust the position of the photodetector in a short time. Further, it is desirable to adjust the position of the photodetector automatically because it is a required task every time the cantilever is replaced.

In a case of attempting an automatic position adjustment of the photodetector, in a case where at least a part of the reflected light of the laser beam has been incident on the photodetector, the scanning probe microscope can grasp the relative positional relation between the photodetector and the reflected light based on the incident position of the reflected light. Therefore, it is possible to move the photodetector so that the spot of the reflected light is brought to be positioned at the center of the photodetector.

In a case where the reflected light of the laser beam has not been incident on the photodetector, the scanning probe microscope cannot grasp the relative positional relation between the photodetector and the reflected light. In this case, for example, it is conceivable to adopt a method in which the reflected light of the laser beam is brought to be incident on the photodetector by moving the photodetector to every corner within the movable range. However, in the method of moving the photodetector in every corner, there is a possibility that it takes time to bring the reflected light of the laser beam to be incident on the photodetector.

The present invention has been made to solve such problems. An object of the present invention is to shorten the time required for adjusting a position of a detection unit such as a photodetector.

Means for Solving the Problem

In a scanning probe microscope according to one aspect of the present invention, the scanning probe microscope includes:
a cantilever;
an irradiation unit configured to irradiate the cantilever with a laser beam;
a detection unit including a light-receiving surface for receiving the laser beam reflected by the cantilever, the detection unit being configured to detect the laser beam incident on the light-receiving surface;
a drive unit configured to move the detection unit along a plane intersecting with an optical axis of the laser beam incident on the light-receiving surface; and
a control unit configured to control the drive unit,
wherein the light-receiving surface is provided with a plurality of light-receiving areas, and
wherein the control unit performs a first control for controlling the drive unit so that the detection unit is moved obliquely with respect to an axis parallel to a boundary line partitioning the plurality of light-receiving areas and a second control for adjusting so that a center of gravity of a spot of the laser beam on the light-receiving surface is brought to be positioned at a center of the light-receiving surface in response to receiving the laser beam by the light-receiving surface.

Effects of the Invention

According to the present invention, it is possible to shorten the time required for adjusting a position of a detection unit in a scanning probe microscope.

EMBODIMENTS FOR CARRYING OUT THE INVENTION

Figure 1:
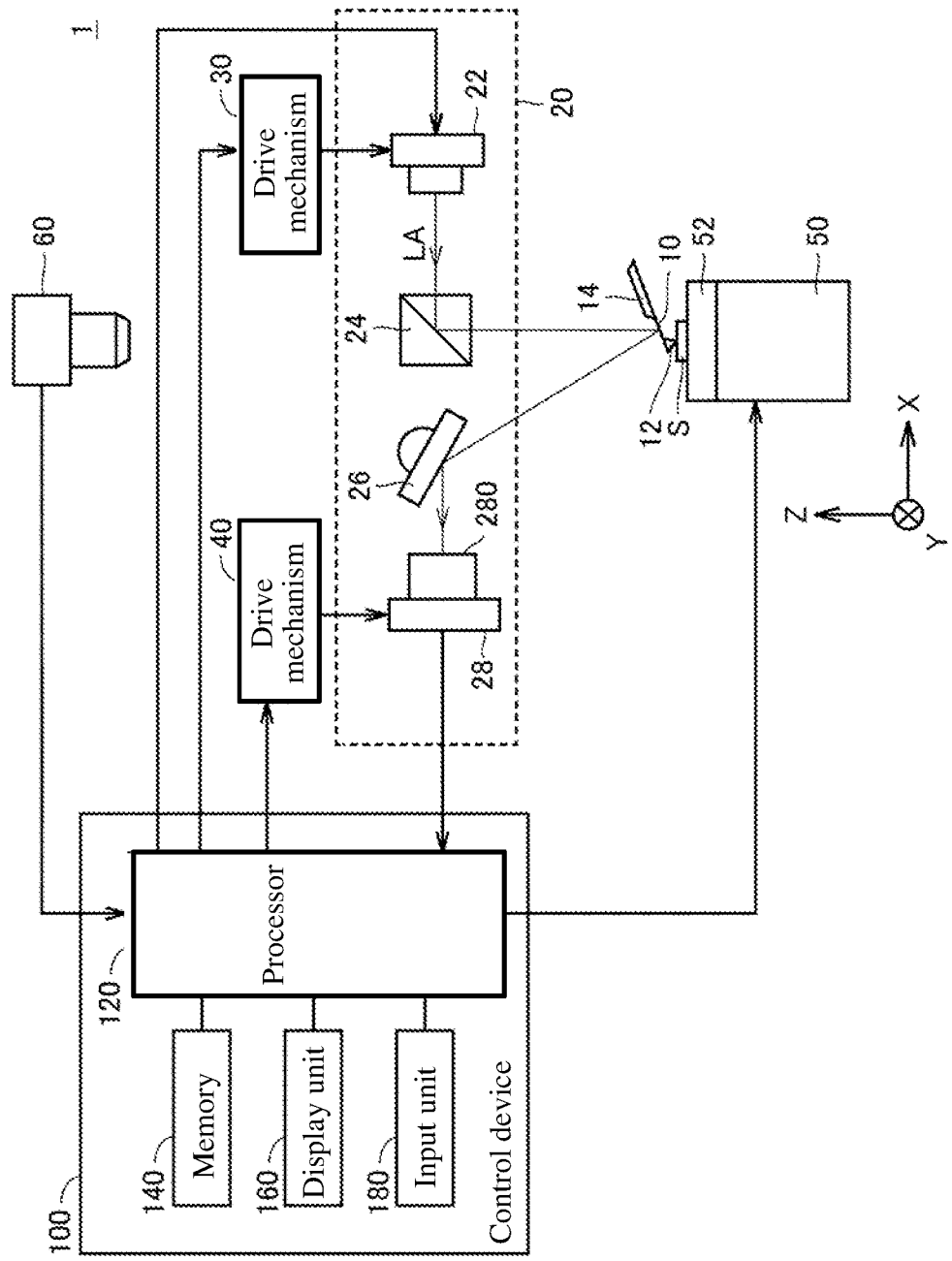
FIG. 1 is a diagram schematically showing a configuration of a scanning probe microscope 1 according to an embodiment of the present invention.

Hereinafter, some embodiments of the present invention will be described in detail with reference to the attached drawings. In the following descriptions, the same or corresponding portions in the drawings will be allotted by the same reference numerals, and the explanation thereof will not be repeated basically.

[Configuration of Scanning Probe Microscope 1]

FIG. 1 is a diagram schematically showing a configuration of a scanning probe microscope 1 according to an embodiment. In the following descriptions, the ground plane of the scanning probe microscope 1 is denoted as an X-Y plane, and an axis perpendicular to the X-Y plane is denoted as a Z-axis.

Referring to FIG. 1, the scanning probe microscope 1 is provided with, as main constituent components, a cantilever 10, a holder 14, an optical system 20, drive mechanisms 30 and 40, a scanner 50, a sample holder 52, an imaging unit 60, and a control device 100.

The cantilever 10 is provided so as to be positioned above the sample S placed on the sample holder 52 at the time of measurement. The cantilever 10 is supported by the holder 14 so as to vibrate vertically and has a probe 12 on a side (tip end side) that is not supported by the holder 14.

The optical system 20 emits, at the time of measurement, a laser beam LA to the back surface of the cantilever 10 (a surface opposite to a surface facing the sample S) and detects the laser beam LA reflected by the back surface of the cantilever 10. The control device 100 computes the deflection of the cantilever 10 based on the laser beam LA detected by the optical system 20. The optical system 20 is provided with a laser light source 22, a beam splitter 24, a reflector 26, and a detector 28.

The laser light source 22 is constituted by a laser oscillator or the like for emitting a laser beam LA. The laser beam LA emitted from the laser light source 22 is reflected by the beam splitter 24 to be directed to the cantilever 10. The laser beam LA emitted to the cantilever 10 is reflected by the back surface of the cantilever 10, further reflected by the reflector 26, and is incident on the detector 28. The detector 28 has a light-receiving surface 280 for receiving the laser beam LA reflected by the back surface of the cantilever 10. The detector 28 detects the laser beam LA received by the light-receiving surface 280 and outputs the obtained detection result to the control device 100.

The drive mechanism 30 moves the laser light source 22 along a plane (the Y-Z plane in the drawing, in the case of the example shown in FIG. 1) perpendicular to the optical axis of the laser beam LA emitted from the laser light source 22. The drive mechanism 30 drives the motor in accordance with the control signal from the control device 100 to move the laser light source 22 to thereby adjust the optical axis of the laser beam LA so that the laser beam LA is reflected by the cantilever 10.

The drive mechanism 40 moves the detector 28 along the plane (the Y-Z plane in the drawing, in the case of the example shown in FIG. 1) perpendicular to the optical axis of the laser beam LA incident on the light-receiving surface 280 reflected by the reflector 26. The drive mechanism 40 drives, for example, a motor in accordance with the control signal from the control device 100 to move the detector 28 to thereby adjust the position of the detector 28 so that the laser beam LA reflected by the cantilever 10 is brought to be incident on the center of the light-receiving surface 280.

The scanner 50 is formed in a cylindrical shape. The sample S is held on top of the sample holder 52 placed on the scanner 50. The scanner 50 is provided with an X-Y scanner for scanning the sample S in the two-axis directions, i.e., the Y-axis direction and the X-axis direction, orthogonal to each other and a Z scanner for finely move the sample S in the Z-axis direction perpendicular to the X-axis direction and the Y-axis direction. The X-Y scanner and the Z scanner are each driven by a driving source configured by a piezoelectric element which deforms by a voltage applied from a drive unit (not shown). The scanner 50 is driven by the X-Y scanner and the Z scanner in three-dimensional directions.

The drive unit controls the X-Y scanner and the Z scanner according to the control signal from the control device 100 to thereby change the relative positional relation between the sample S and the probe 12 on the scanner 50.

The imaging unit 60 is disposed above the probe 12 to image the cantilever 10 from above. The imaging unit 60 acquires image data by imaging a subject present in the imaging field of view. The imaging unit 60 includes, as main constituent elements, an optical system, such as, e.g., a lens and a diaphragm, and a light-receiving element, such as, e.g., a CCD (Charge Coupled Device) image sensor and a CMOS (Complementary Metal Oxide Semiconductor) image sensor. The imaging unit 60 outputs the acquired image data to the control device 100. The image data acquired by the imaging unit 60 is used, for example, to adjust the optical axis of the laser beam LA.

The control device 100 controls the operation of each portion constituting the scanning probe microscope 1. The control device 100 is configured in accordance with general-purpose computer architecture as an example. Note that the control device 100 may be implemented by using hardware dedicated to the scanning probe microscope 1. The control device 100 is equipped with a processor 120, a memory 140, a display unit 160, and an input unit 180.

The processor 120 is typically an arithmetic unit, such as, e.g., a CPU (Central Processing Unit) and an MPU (Multi Processing Unit). The processor 120 reads out and performs the program stored in the memory 140 to realize each of the processing of the control device 100 which will be described later. In the example of FIG. 1, the configuration in which the processor is composed of a single element is illustrated, but the control device 100 may be composed of a plurality of processors.

The memory 140 is realized by a non-volatile memory, such as, e.g., a RAM (Random Access Memory), a ROM (Read Only Memory), and a flash memory. The memory 140 stores programs to be performed by the processor 120 or data to be used by the processor 120. For example, the memory 140 stores a program for performing a position adjustment process S1 of the laser light source 22 and a position adjustment process S2 of the detector 28, which will be described later.

Note that the memory 140 may be a CD-ROM (Compact Disc-Read Only Memory), a DVD-ROM (Digital Versatile Disk-Read Only Memory), a USB (Universal Serial Bus) memory, a memory card, an FD (Flexible Disk), a hard disk, an SSD (Solid State Drive), a magnetic tape, a cassette tape, an MO (Magnetic Optical Disc), an MD (Mini Disc), an IC (Integrated Circuit) card (except for a memory card), an optical card, a mask ROM, or an EPROM, as long as it is possible to non-temporarily store a program in a format capable of being read by the control device 100 which is one type of computers.

The display unit 160 is configured by a liquid crystal display panel or the like. The display unit 160 displays, for example, measurement results obtained by measurements with the scanning probe microscope 1 or various setting screens for performing measurements by the scanning probe microscope 1.

The input unit 180 is configured by a mouse, a keyboard, and the like. The input unit 180 is an input interface for receiving information input via the input unit 180. The control device 100 may be provided with a touch panel in which the display unit 160 and the input unit 180 are integrated.

[Optical Axis Adjustment to be Performed at the Time of Starting Measurement]

In the scanning probe microscope 1, the optical system 20 is required to be adjusted such that the position (the position where the light-receiving quantity is the largest) of the laser beam LA reflected by the cantilever 10 is brought to be positioned at the center of the light-receiving surface 280 of the detector 28 in a state in which the cantilever 10 is not deflected. This optical axis adjustment is performed each time the cantilever 10 is replaced.

Figure 2:
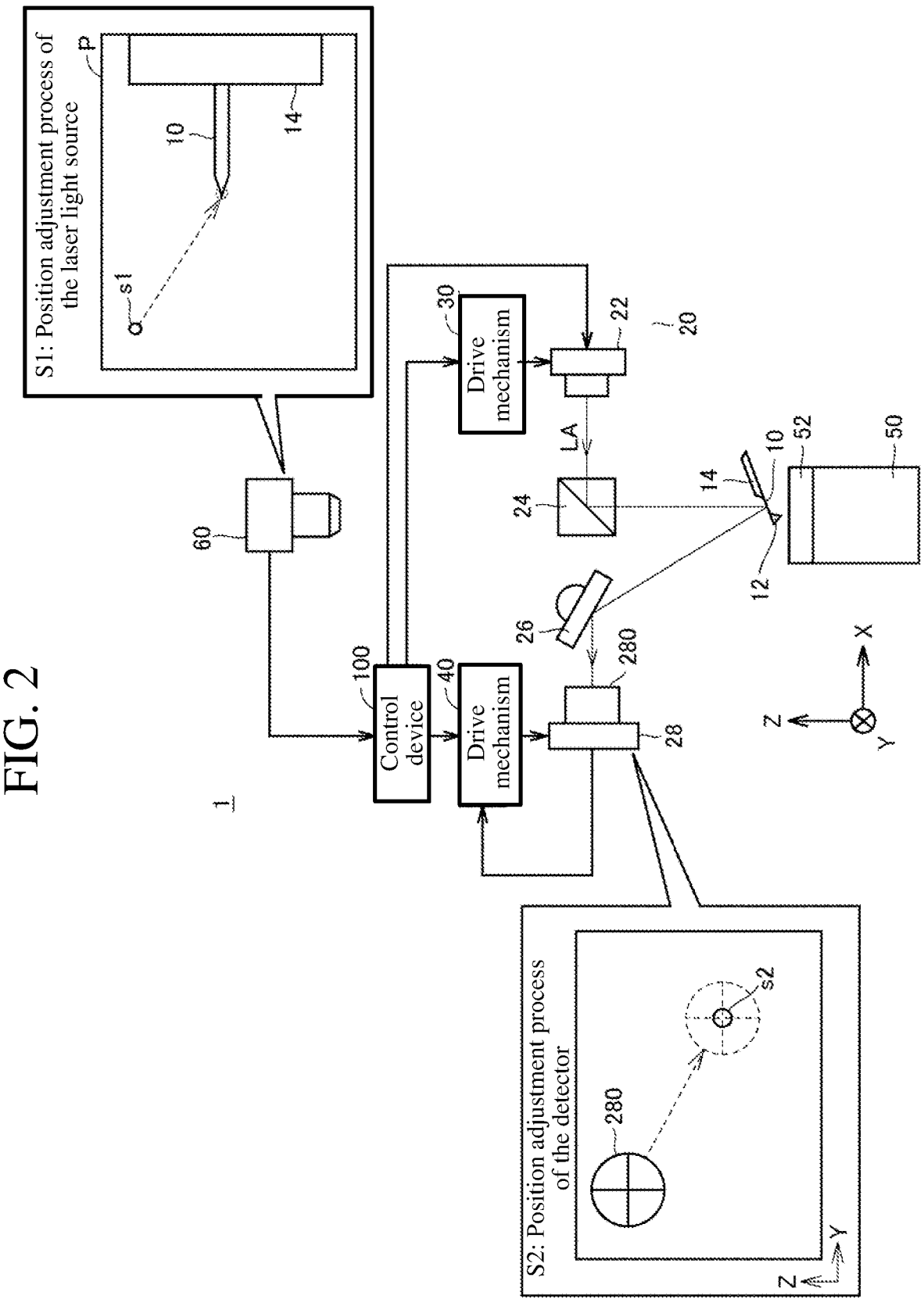
FIG. 2 is a diagram for schematically explaining an optical axis adjustment method performed at the time of starting measurement.

FIG. 2 is a schematic diagram for explaining the optical axis adjustment method to be performed at the time of starting measurements. The process for the optical axis adjustment includes a position adjustment process S1 of the laser light source 22 and a position adjustment process S2 of the detector 28.

The control device 100 performs the position adjustment process S1 of the laser light source 22 upon receipt of an instruction to start the optical axis adjustment. In the position adjustment process S1 of the laser light source 22, the control device 100 adjusts the position of the laser light source 22 so that the spot s1 formed by the laser beam LA emitted to the sample holder 52 or the cantilever 10 is brought to be positioned at the tip end of the cantilever 10. The control device 100 specifies the positional relation between the spot s1 and the tip end of the cantilever 10 based on the image P generated by the imaging unit 60. The control device 100 controls the drive mechanism 30 based on the specified positional relation to move the laser light source 22 in the Y-direction and the Z-direction in the drawing so that the spot s1 is brought to be positioned at the tip end of the cantilever 10.

When the control device 100 determined that the spot s1 is positioned at the tip end of the cantilever 10, the control device 100 performs the position adjustment process S2 of the detector 28. Note that the position adjustment process S2 of the detector 28 may be performed in response to receiving a starting instruction of the position adjustment process S2 of the detector 28. In the position adjustment process S2 of the detector 28, the control device 100 adjusts the position of the detector 28 so that the spot s2 of the laser beam LA reflected by the cantilever 10 (spot s2 formed by the light-receiving surface 280 irradiated with the laser beam LA) is brought to be positioned at the center of the light-receiving surface 280.

Note that Step S1 may be performed by a user. More specifically, an operation unit used to drive the drive mechanism 30 for moving the laser light source 22 may be further provided in the scanning probe microscope 1, and the user may operate the operation unit while checking the image P displayed on the display unit 160 to realize Step S1.

[Configuration of Detector 28]

Figure 3:
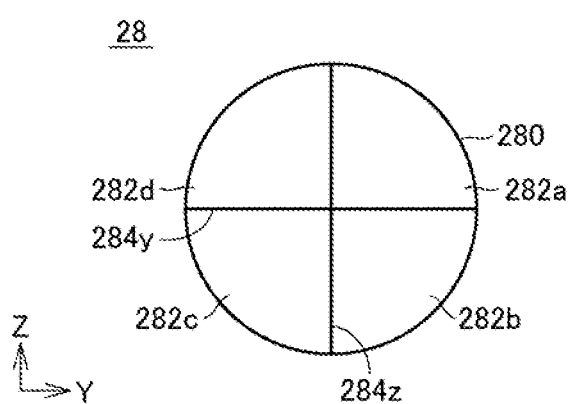
FIG. 3 is a diagram showing a configuration of a detector 28.

FIG. 3 is a diagram showing the configuration of the detector 28. The detector 28 includes a light-receiving surface 280. The detector 28 is provided so that the plane (Y-Z plane) perpendicular to the laser beam LA reflected by the reflector 26 and the light-receiving surface 280 are parallel to each other.

The light-receiving surface 280 includes four photodiodes 282. That is, the light-receiving surface 280 is divided into four light-receiving areas. Each photodiode 282 converts the light quantity of the incident light into a voltage and outputs the converted voltage to the outside as a light-receiving signal. The detector 28 compares the respective output light-receiving signals to detect the center of gravity of the spot s2 in the light-receiving surface 280. Here, the center of gravity of the spot s2 means the center of gravity of the light quantity of the spot s2.

More specifically, the detector 28 compares the respective light-receiving signals output from the respective photodiodes 282 to obtain the transverse direction signal indicating the displacement of the spot s2 in the Y-direction of the spot s2 and the vertical direction signal indicating the displacement of the spot s2 in the Z-direction of the spot s2. The detector 28 outputs the vertical direction signal, the transverse direction signal, and the signal indicating the intensity of the laser beam LA received by the light-receiving surface 280 to the control device 100.

The vertical direction signal is obtained, for example, by the subtraction between the sum of the light-receiving signal from the photodiode $282a$ and the light-receiving signal from the photodiode $282d$ and the sum of the light-receiving signal from the photodiode $282b$ and the light-receiving signal from the photodiode $282c$.

The transverse direction signal is obtained, for example, by the subtraction between the sum of the light-receiving signal from the photodiode $282a$ and the light-receiving signal from the photodiode $282b$ and the sum of the light-receiving signal from photodiode $282c$ and the light-receiving signal from photodiode $282d$.

For example, when the center of gravity of the spot s2 passes over the boundary line $284y$ partitioning the light-receiving surface 280 in the Z-axis direction, the polarity (positive/negative) of the vertical direction signal is reversed. On the other hand, when the center of gravity of the spot s2 passes over the boundary line $284z$ partitioning the light-receiving surface 280 in the Y-axis direction, the polarity (positive/negative) of the transverse direction signal is reversed. When the center of gravity of the spot s2 is positioned at the center of the light-receiving surface 280, i.e., when the center of gravity of the spot s2 is positioned at the intersection of the boundary line $284y$ and the boundary line $284z$, the transverse direction signal and the vertical direction signal are both zero (0).

The entity for computing the transverse direction signal and the vertical direction signal is not limited to the detector 28. For example, the entity for computing the transverse direction signal and the vertical direction signal may be the control device 100. In this instance, the detector 28 outputs the light-receiving signal from each photodiode 282 to the control device 100.

[Position Adjustment Process S2 of Detector 28]

Figure 4:
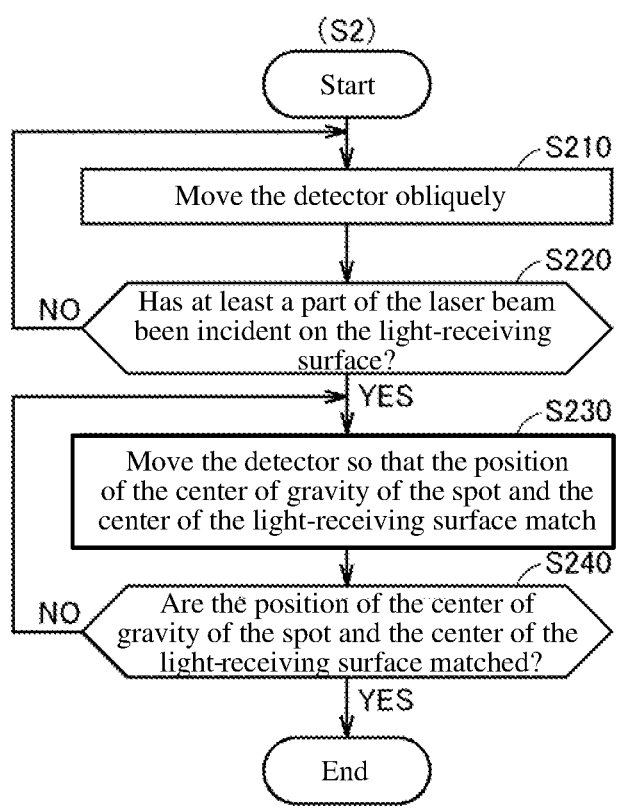
FIG. 4 is a flowchart of a position adjustment process S2 of the detector 28 performed by a control device 100.

FIG. 4 is a flowchart of a position adjustment process S2 of the detector 28 performed by the control device 100. In Step S210, the control device 100 moves the detector 28 obliquely. Here, the term "oblique(ly)" means that neither "parallel" nor "perpendicular" to at least one of the boundary line 284y and the boundary line 284z partitioning the photodiodes 282 on the plane in which the detector 28 moves.

In Step S220, the control device 100 determines whether or not at least a part of the laser beam LA has been incident on the light-receiving surface 280. For example, the control device 100 determines whether or not at least a part of the laser beam LA has been incident on the light-receiving surface 280 based on whether or not the signal indicating the intensity output from the detector 28 has exceeded a predetermined threshold.

When the control device 100 determined that at least a part of the laser beam LA has been incident on the light-receiving surface 280 (YES in Step S220), the control device 100 performs the process of Step S230 and subsequent processes.

When the control device 100 determined that the laser beam LA has not been incident on the light-receiving surface 280 (No in Step S220), the control device 100 performs the process of Step S210. For example, the control device 100 performs the process of Step S210 each time the detector 28 is moved along a predetermined traveling path by a predetermined distance by performing the process of Step S220, and further determines whether to move the detector 28 or to perform the process of Step S230 and subsequent processes.

The control device 100 performs the process of Step S230 and subsequent processes in response to the incident of at least a part of the laser beam LA on the light-receiving surface 280 while moving the detector 28 obliquely.

In Step S240, the control device 100 moves the detector 28 so as to coincide the center of gravity of the spot s2 with the center of the light-receiving surface 280. For example, the control device 100 specifies the approximate position of the center of gravity of the spot s2 in the plane of the light-receiving surface 280 based on the output result from the detector 28, and moves the detector 28 toward the specified position.

In Step S240, the control device 100 determines whether or not the center of gravity of the spot s2 and the center of the light-receiving surface 280 coincide. When the control device 100 determines that the center of gravity of the spot s2 coincides with the center of the light-receiving surface 280 (YES in Step S240), the control device 100 ends the position adjustment process S2 of the detector 28.

When the control device 100 determines that the center of gravity of the spot s2 and the center of the light-receiving surface 280 do not coincide (NO in Step S240), the control device 100 repeats the process of Step S230 until the center of gravity of the spot s2 and the center of the light-receiving surface 280 coincide.

That is, the control device 100 moves the detector 28 along a predetermined traveling path until at least a part of the laser beam LA is incident on the light-receiving surface 280 and performs feedback control based on the output result from the detector 28 so as to coincide the center of gravity of the spot s2 with the center of the light-receiving surface 280 in response to the incident of at least a part of the laser beam LA on the light-receiving surface 280.

Note that the control device 100 specifies the approximate position of the laser beam LA reflected by the cantilever 10 by performing the process of Step S210. Then, the control device 100 finely adjusts the position of the detector 28 so that the center of gravity of the spot s2 and the center of the light-receiving surface 280 coincide by performing the process of Step S240. Therefore, the control device 100 may make the distance to move the detector 28 by performing the process of Step S210 longer than the distance to move the detector 28 by performing the process of Step S230. This allows the control device 100 to quickly specify the approximate position of the laser beam LA reflected by the cantilever 10.

[Traveling Path of Detector 28]

Figure 5:
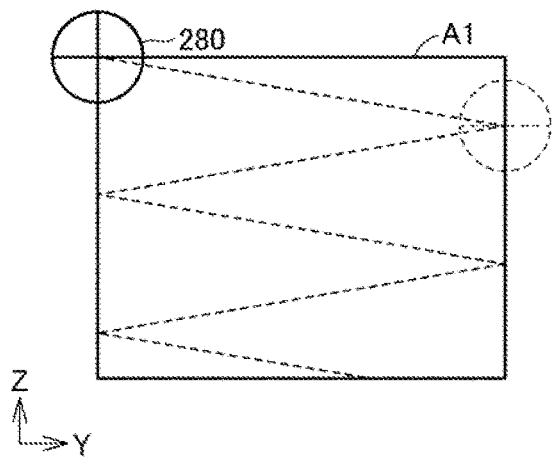
FIG. 5 is a diagram illustrating an example of a traveling path along which the detector 28 follows by repeating the process of Step S210.

FIG. 5 is a diagram illustrating an example of the traveling path of the detector 28 along which the detector follows by repeating the process of Step S210. FIG. 6 to FIG. 9 illustrate alternative examples of traveling paths of the detector 28. Here, the area A1 in the drawing denotes a movable range in which the detector 28 can be moved.

For example, the control device 100 moves the detector 28 obliquely until the detector 28 reaches the movable allowable limit position in the Y-direction. When the detector 28 has reached the limit position, the control device 100 changes the traveling direction of the detector 28 to move the detector obliquely again until it reaches a movable allowable limit position in the Y-direction. By repeating reaching the limit position and changing the traveling direction, the detector 28 will follow a zigzag traveling path with a predetermined angle.

Figure 6:
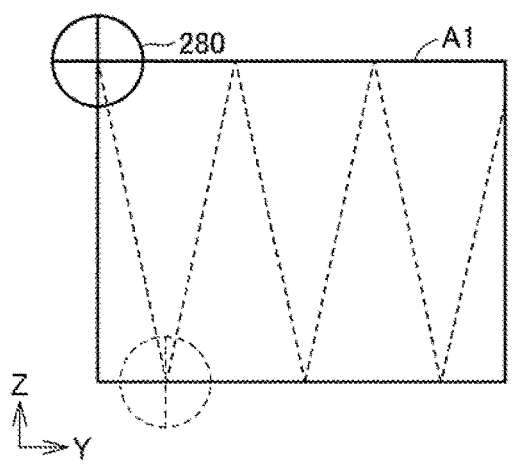
FIG. 6 is a diagram showing another example of the traveling path of the detector 28.
Figure 7:
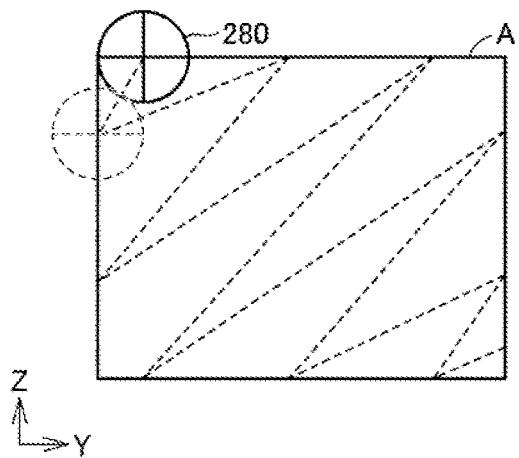
FIG. 7 is a diagram showing still another example of the traveling path of the detector 28.
Figure 8:
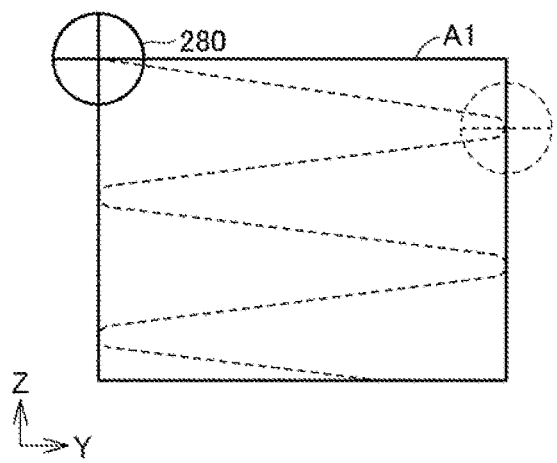
FIG. 8 is a diagram showing still yet another example of the traveling path of the detector 28.
Figure 9:
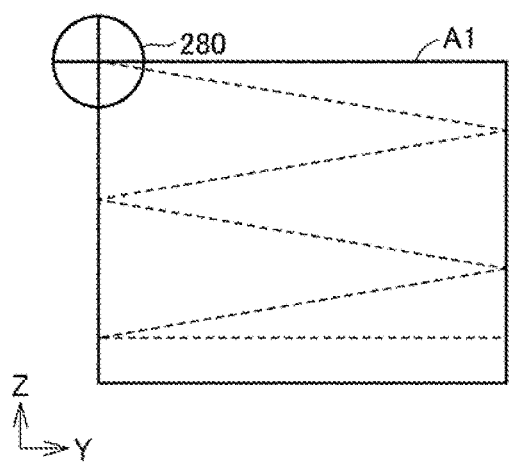
FIG. 9 is a diagram showing still yet another example of the traveling path of the detector 28.

Note that the traveling path of the detector 28 shown in FIG. 5 is a zigzag path along the Z-axis direction. As shown in FIG. 6, the traveling path of the detector 28 may be a zigzag path along the Y-axis. Further, the traveling path of the detector 28 may be a zigzag path along the diagonal directions as shown in FIG. 7. Furthermore, the traveling path of the detector 28 may be a wavy path in which the corner of the zigzag path curves, as shown in FIG. 8. Further, as shown in FIG. 9, a part of the traveling path may be straight.

[Flow of Position Adjustment of Detector 28]

Figure 10:
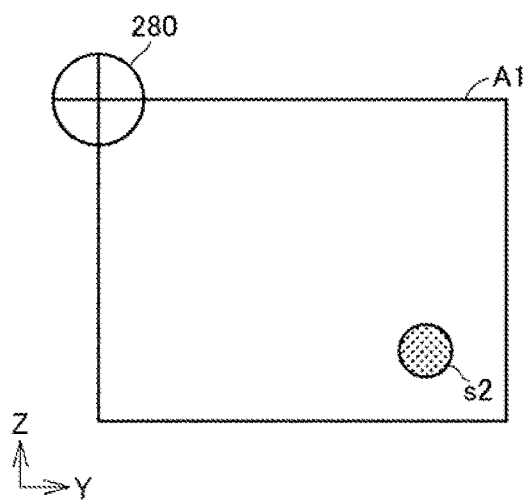
FIG. 10 is a diagram showing a state in which the detector 28 starts the position adjustment process S2.
Figure 11:
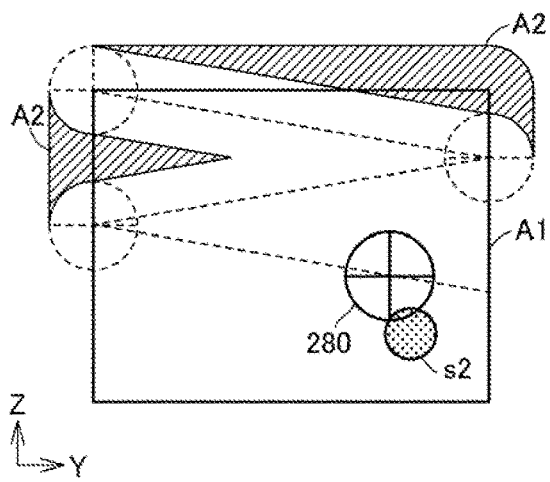
FIG. 11 is a diagram showing a state in which the detector 28 is moved obliquely.
Figure 12:
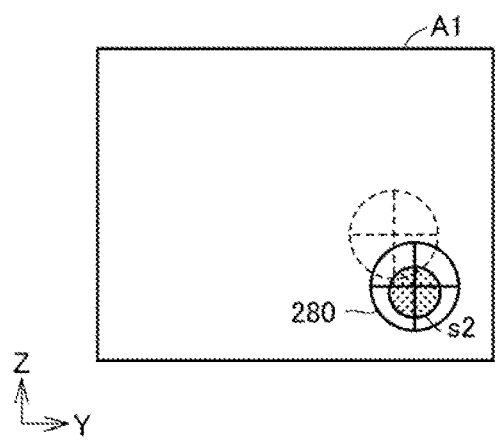
FIG. 12 is a diagram showing a state in which the detector 28 is moved so that the center of the light-receiving surface 280 is moved toward the position of the center of gravity of the spot s2.

Referring to FIG. 10 to FIG. 12, the flow of the position adjustment of the detector 28 will be described. FIG. 10 is a diagram showing the state of starting the position adjustment process S2 of the detector 28. FIG. 11 is a diagram showing the situation in which the detector 28 is moved obliquely. FIG. 12 is a diagram showing the state in which the detector 28 is moved so that the center of the light-receiving surface 280 is advanced toward the center of gravity of the spot s2.

As shown in FIG. 10, when the laser beam LA has not been incident on the light-receiving surface 280 at the start of performing the position adjustment process S2 of the detector 28, the control device 100 cannot specify at which position in the area A1 the spot s2 is formed. In this embodiment, the control device 100 moves the detector 28 obliquely in this condition.

By moving the detector 28 obliquely, as shown in FIG. 11, it is assumed that at least a part of the laser beam LA is incident on the light-receiving surface 280. When at least a part of the laser beam LA is incident on the light-receiving surface 280, the control device 100 can identify on which side of the light-receiving surface 280 the laser beam LA has been incident based on the transverse direction signal and the vertical direction signal output from the detector 28. Therefore, as shown in FIG. 12, the control device 100 can move the detector 28 so that the center of the light-receiving surface 280 is advanced toward the center of gravity of the spot s2.

Figure 16:
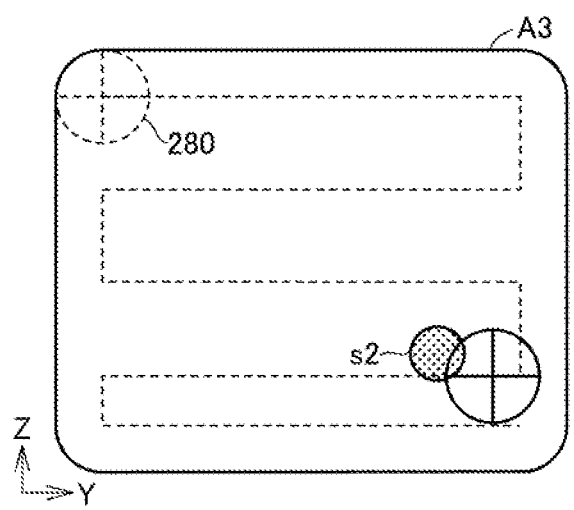
FIG. 16 is a view showing the traveling path of the detector 28 according to Comparative Example.

FIG. 16 is a view showing the traveling path of the detector 28 according to Comparative Example. The area A3 in FIG. 16 denotes an area in which the laser beam LA can be captured by the light-receiving surface 280. As shown in FIG. 16, in cases where the detector 28 is moved all the way to the corner where the light-receiving surface 280 can capture the laser beam LA, it is required to move the detector 28 in parallel to or perpendicular to the Y-axis. As can be seen by comparing FIG. 11 and FIG. 16, in cases where the detector 28 is moved obliquely, as compared with the case in which the detector 28 is moved so as to pass the entire range capable of capturing the laser beam LA by the light-receiving surface 280, it is possible to shorten the traveling amount required for the light-receiving surface 280 to capture the laser beam LA.

Here, as shown in FIG. 11, when the detector 28 is moved obliquely, the light-receiving surface 280 does not pass over the area A2. The laser beam LA has a certain degree of spread by its nature. Therefore, the spot s2 has a predetermined length in the Z-axis direction and the Y-axis direction. Since the spot s2 has a certain size, at least a part of the laser beam LA can be captured by the light-receiving surface 280 even if the area A2 which is not passed by the light-receiving surface 280 is generated by moving the detector 28 obliquely.

Thus, in this embodiment, by moving the detector 28 obliquely, it becomes possible to shorten the distance required for the light-receiving surface 280 to capture the laser beam LA, resulting in shortening the time required for positioning the detector 28.

When the detector 28 is moved obliquely, the area A2 is generated in which the light-receiving surface 280 does not pass. For this reason, when moving obliquely, it is preferable that the inclination of the traveling path of the detector 28 be set to an inclination to the extend that at least a part of the laser beam LA can be captured by the light-receiving surface 280 even if the area A2 that is not passed by the light-receiving surface 280 occurs.

Figure 13:
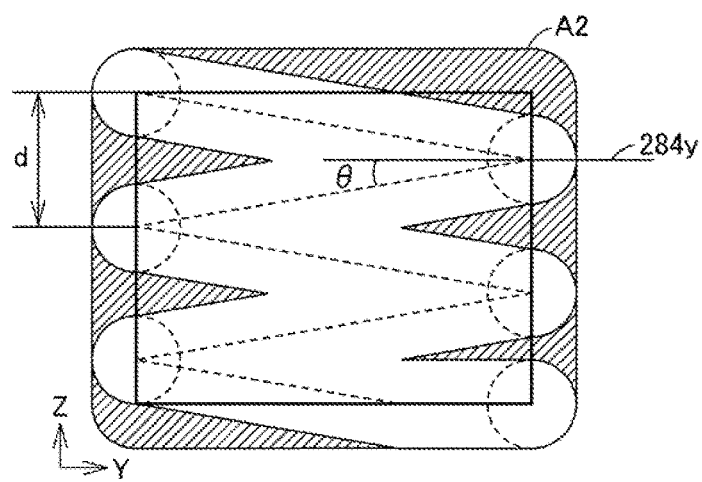
FIG. 13 is a diagram for explaining the condition of the traveling path.

FIG. 13 is a diagram for explaining the condition of the traveling path. For example, the traveling path of the detector 28 is preferable set such that the largest distance d between the adjacent traveling paths is shorter than the sum of the diameter of the light-receiving surface 280 and the diameter of the spot s2. From another viewpoint, it is preferable that the traveling path of the detector 28 be ten (10) degrees or less in the angle θ with respect to the boundary line 284y.

Figure 14:
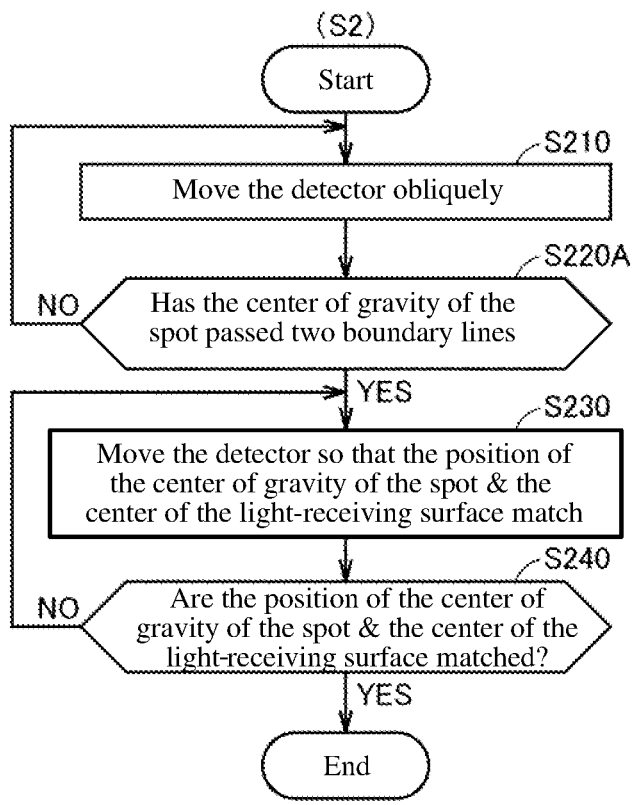
FIG. 14 is a flowchart of the position adjustment process S2 of the detector 28 performed by the control device 100 according to a modification.

[Modifications]
(Condition to Switch to Feedback Control)
FIG. 14 is a flowchart of the position adjustment process S2 of the detector 28 performed by the control device 100 according to a modification. The position adjustment process S2 of the detector 28 shown in FIG. 14 differs from the position adjustment process S2 of the detector 28 according to the above-described embodiment in that Step S220A is performed instead of Step S220. Hereinafter, the differences from the position adjustment process S2 of the detector 28 according to the above-described embodiment will be mainly described.

In Step S220A, the control device 100 determines whether or not the center of gravity of the spot s2 has passed over the boundary line 284y and the boundary line 284z. Specifically, the control device 100 determines whether or not both the polarity (positive/negative) inversion of the transverse direction signal output from the detector 28 and the polarity (positive/negative) inversion of the vertical direction signal have been detected. Note that it is not required that the timing at which the polarity (positive/negative) inversion of the transverse direction signal occurred and the timing at which the polarity (positive/negative) inversion of the vertical direction signal occurred coincide with each other. When the control device 100 determines that the center of gravity of the spot s2 has passed over the boundary line 284y and the boundary line 284z (Yes in Step S220A), the control device 100 switches to feedback control of Step S230 and subsequent steps.

That is, the condition for switching to the feedback control is not limited to the condition described in the above-described embodiment and may be a condition that the center of gravity of the spot s2 has passed over the boundary line 284y and the boundary line 284z.

Note that the condition for switching to the feedback control may be a condition in which the center of gravity of the spot s2 has passed over at least one of the boundary line 284y and the boundary line 284z.

Figure 15:
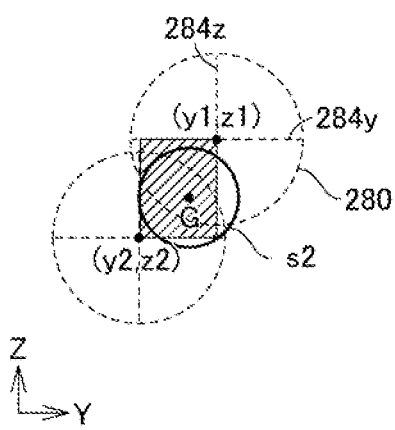
FIG. 15 is a diagram showing a method of specifying the center of gravity of the spot s2.

FIG. 15 is a diagram showing a method of specifying the center of gravity of the spot s2. For example, in Step S210, it is assumed that the control device 100 moved the detector 28 from the coordinate (y1, z1) to the coordinate (y2, z2) on the Y-Z plane. In this case, both of the boundary line 284y and the boundary line 284z pass over the center of gravity G of the spot s2. Therefore, the control device 100 can specify that the center of gravity G is within the range of (y2<y<y1, z2<z<z1) (the range indicated by hatching in FIG. 15).

At the stage in which a part of the laser beam LA has been incident on the light-receiving surface 280, the control device 100 can merely grasp the approximate position of the laser beam LA. In contrast, when the center of gravity of the spot s2 passed over any one of the boundary lines 284, it is possible to specify that the center of gravity of the spot s2 is positioned at the location where the detector 28 was positioned at the timing at which the polarity (positive/negative) of the signal sent from the detector 28 was inverted. Therefore, it is possible to shorten the time required for the process of Step S230 and subsequent processes. Consequently, the total time required for the position adjustment process S2 of the detector 28 can be reduced.

(Traveling Path of Detector 28)
In the above-described embodiment, it is assumed that the traveling path of the detector 28 along which the detector follows by repeating the process of Step S210 is a zigzag path. When the movable range of the detector 28 is sufficiently small, the traveling path of the detector 28 along which the detector follows by repeating the process of Step S210 may be an oblique path. In the above-described embodiment, the traveling path of the detector 28 is a predetermined route. Note that the control device 100 may randomly move the detector 28 obliquely in Step S210. Further note that the control device 100 may generate the traveling path of the detector 28 based on the intensity of the laser beam LA, the reflectance of the laser beam LA relative to the cantilever 10, the area of the light-receiving surface 280, and move the detector 28 along the generated traveling path.

(Number of Division of Light-Receiving Surface 280)

In the above-described embodiment, the detector 28 has been described as having a light-receiving surface 280 divided into four (4) areas. The light-receiving surface 280 of the detector 28 may be divided into two (2) areas, or may be divided into five (5) or more areas.

(Method of Adjusting so that the Center of Gravity of Spot Coincides with the Center of Light-Receiving Surface)

In the above-described embodiment, the control device 100 moves the detector 28 in Step S230. Note that the method of adjusting so that the center of gravity of the spot and the center of the light-receiving surface coincide with each other is not limited to the method of moving the detector 28. For example, the control device 100 may adjust so that the center of gravity of the spot coincides with the center of the light-receiving surface by moving the reflector 26.

(Processing Implementation Method)

In the above-described embodiment, the configuration example has been described in which the processor 120 performs a program to perform the position adjustment process 51 of the laser light source 22 and the position adjustment process S2 of the detector 28, but some or all of the functions provided by these processes may be implemented by using a dedicated hardware circuit (e.g., an ASIC (Application Specific Integrated Circuit), an FPGA (Field-Programmable Gate Array)), or the like.

(Movable Range of Detector 28)

In the above-described embodiment, the movable range in which the detector 28 can be moved is a rectangular area A1 in the Y-Z plane. Note that the movable range of the detector 28 is not limited to the Y-Z plane, and it is sufficient to be set in a plane intersecting with the optical axis of the laser beam LA reflected by the cantilever. The shape of the area A1, which is the movable range of the detector 28, is not limited to a quadrilateral shape and may be a circular shape or another shape.

[Aspects]

It will be understood by those skilled in the art that the plurality of exemplary embodiments described above is illustrative of the following aspects.

(Item 1)

A scanning probe microscope according to one aspect of the present invention, includes:

a cantilever;

an irradiation unit configured to irradiate the cantilever with a laser beam;

a detection unit including a light-receiving surface for receiving the laser beam reflected by the cantilever, the detection unit being configured to detect the laser beam incident on the light-receiving surface;

a drive unit configured to move the detection unit along a plane intersecting with an optical axis of the laser beam incident on the light-receiving surface; and a control unit configured to control the drive unit, wherein the light-receiving surface is provided with a plurality of light-receiving areas, and wherein the control unit performs a first control for controlling the drive unit so that the detection unit is moved obliquely with respect to an axis parallel to a boundary line partitioning the plurality of light-receiving areas and a second control for adjusting so that a center of gravity of a spot of the laser beam on the light-receiving surface is brought to be positioned at a center of the light-receiving surface in response to receiving the laser beam by the light-receiving surface.

According to the scanning probe microscope described in the above-described Item 1, it is possible to shorten the time required for adjusting the position of the detection unit.

(Item 2)

In the scanning probe microscope as recited in the above-described Item 1, it may be configured such that the control unit performs the second control in response to detection by the detection unit that the center of gravity of the spot has passed over a boundary line partitioning the plurality of light-receiving areas.

According to the scanning probe microscope described in the above-described Item 2, it is possible to shorten the time required for adjusting the position of the detection unit. Further, the control device can specify the approximate position of the center of gravity of the spot. As a result, the time required for the second control can be shortened.

(Item 3)

In the scanning probe microscope as recited in the above-described Item 2, it may be configured such that the light-receiving surface has four of the light-receiving areas, and the control unit performs the second control in response to detection by the detection unit that the center of gravity of the spot has passed over a first boundary line partitioning the light-receiving surface in a first direction and a second boundary line partitioning the light-receiving surface in a second direction different from the first direction.

According to the scanning probe microscope described in the above-described Item 3, it is possible to shorten the time required for adjusting the position of the detection unit. Further, the control device can specify the approximate center of gravity of the spot. As a result, the time required for the second control time can be shortened.

(Item 4)

In the scanning probe microscope as recited in any one of the above-described Items 1 to 3, it may be configured such that the second control is feedback control for controlling the drive unit based on a detection result of the detection unit.

According to the scanning probe microscope described in the above-described Item 4, it is possible to shorten the time required for adjusting the position of the detection unit.

(Item 5)

In the scanning probe microscope as recited in any one of Items 1 to 4, it may be configured such that the first control is control for moving the detection unit along a traveling path including a zigzag traveling path, and the zigzag traveling path is a traveling path whose maximum distance between adjacent traveling paths is smaller than a length obtained by adding a diameter of the light-receiving surface to a diameter of the spot of the laser beam.

According to the scanning probe microscope described in the above-described item 5, it is possible to shorten the time required for adjusting the position of the detection unit.

(Item 6)

In the scanning probe microscope as recited in any one of the above-described Items 1 to 4, it may be configured such that the control unit performs the first control so that a traveling direction of the detection unit is ten (10) degrees or less with respect to an axis parallel to the boundary line partitioning the plurality of light-receiving areas.

According to the scanning probe microscope described in the above-described Item 6, it is possible to shorten the time required for adjusting the position of the detection unit.

(Item 7)

In an optical axis adjustment method in a scanning probe microscope according to another aspect of the present invention, the scanning probe microscope includes:

a cantilever;
an irradiation unit configured to irradiate the cantilever with a laser beam; and
a detection unit including a light-receiving surface for receiving the laser beam reflected by the cantilever, the detection unit being configured to detect the laser beam incident on the light-receiving surface,
wherein the light-receiving surface has a plurality of light-receiving areas,
wherein the optical axis adjustment method comprises:
a step of moving the detection unit obliquely with respect to an axis parallel to a boundary line partitioning the plurality of light-receiving surfaces on a plane intersecting with an optical axis of the laser beam incident on the light-receiving surface; and
a step of adjusting such that a center of gravity of a spot of the laser beam on the light-receiving surface is brought to be positioned at a center of the light-receiving surface in response to receiving the laser beam by the light-receiving surface.

According to the scanning probe microscope position adjustment method described in the above-described Item 7, it is possible to shorten the time required for adjusting the position of the detection unit.

The embodiments disclosed herein are to be considered in all respects as illustrative and not restrictive. The scope of the present invention is indicated by the appended claims rather than by the above-described foregoing descriptions and is intended to include all modifications within the meanings and ranges equivalent to the scope of the claims.

DESCRIPTION OF SYMBOLS

1: Scanning probe microscope
10: Cantilever
12: Probe
14: Holder
20: Optical system
22: Laser light source
24: Beam splitter
26: Reflector
28: Detector
30, 40: Drive mechanism
50: Scanner
52: Sample holder
60: Imaging unit
100: Control device
120: Processor
140: Memory
160: Display unit
180: Input unit
205: Inspection program
280: Light-receiving surface
282: Photodiode
284: Boundary line
LA: Laser beam
P: Image
S: Sample

The invention claimed is:

1. A scanning probe microscope comprising:
a cantilever;
an irradiation unit configured to irradiate the cantilever with a laser beam;
a detection unit including a light-receiving surface for receiving the laser beam reflected by the cantilever, the detection unit being configured to detect the laser beam incident on the light-receiving surface;
a drive unit configured to move the detection unit along a plane intersecting with an optical axis of the laser beam incident on the light-receiving surface; and
a control unit configured to control the drive unit,
wherein the light-receiving surface is provided with a plurality of light-receiving areas, and
wherein the control unit performs a first control for controlling the drive unit so that the detection unit is moved obliquely with respect to an axis parallel to a boundary line partitioning the plurality of light-receiving areas and a second control for adjusting so that a center of gravity of a spot of the laser beam on the light-receiving surface is brought to be positioned at a center of the light-receiving surface in response to receiving the laser beam by the light-receiving surface.

2. The scanning probe microscope as recited in claim 1, wherein the control unit performs the second control in response to detection by the detection unit that the center of gravity of the spot has passed over the boundary line partitioning the plurality of light-receiving areas.

3. The scanning probe microscope as recited in claim 2, wherein the light-receiving surface has four of the light-receiving areas, and
wherein the control unit performs the second control in response to detection by the detection unit that the center of gravity of the spot has passed over a first boundary line partitioning the light-receiving surface in a first direction and a second boundary line partitioning the light-receiving surface in a second direction different from the first direction.

4. The scanning probe microscope as recited in claim 1, wherein the second control is feedback control for controlling the drive unit based on a detection result of the detection unit.

5. The scanning probe microscope as recited in claim 1, wherein the first control is control for moving the detection unit along a traveling path including a zigzag traveling path, and
wherein the zigzag traveling path is a traveling path whose maximum distance between adjacent traveling paths is smaller than a length obtained by adding a diameter of the light-receiving surface to a diameter of the spot of the laser beam.

6. The scanning probe microscope as recited in claim 1, wherein the control unit performs the first control so that a traveling direction of the detection unit is 10 degrees or less with respect to an axis parallel to the boundary line partitioning the plurality of light-receiving areas.

7. An optical axis adjustment method in a scanning probe microscope,
wherein the scanning probe microscope comprising:
a cantilever;
an irradiation unit configured to irradiate the cantilever with a laser beam; and
a detection unit including a light-receiving surface for receiving the laser beam reflected by the cantilever, the detection unit being configured to detect the laser beam incident on the light-receiving surface,
wherein the light-receiving surface has a plurality of light-receiving areas,
wherein the optical axis adjustment method comprises:
a step of moving the detection unit obliquely with respect to an axis parallel to a boundary line partitioning the plurality of light-receiving surfaces on a plane intersecting with an optical axis of the laser beam incident on the light-receiving surface; and a step of adjusting such that a center of gravity of a spot of the laser beam on the light-receiving surface is brought to be positioned at a center of the light-receiving surface in response to receiving the laser beam by the light-receiving surface.

\* \* \* \* \*